United States Patent [19]

Foster

[11] Patent Number: 5,007,567
[45] Date of Patent: Apr. 16, 1991

[54] SUPPORT RACK FOR BICYCLES AND THE LIKE

[76] Inventor: Jeffrey P. Foster, 13276 Research Blvd. #208, Austin, Tex. 78750

[21] Appl. No.: 533,411

[22] Filed: Jun. 5, 1990

[51] Int. Cl.⁵ .......................... B60D 43/00; B60R 9/00
[52] U.S. Cl. ............................... 224/42.13; 224/42.25; 224/42.03 B
[58] Field of Search ................. 224/42.03 B, 42.12, 224/42.13, 42.14, 42.25; 211/5, 17, 18, 19, 20, 21, 22

[56] References Cited

U.S. PATENT DOCUMENTS

| | | | |
|---|---|---|---|
| 4,189,074 | 2/1980 | Davies | 224/42.06 |
| 4,392,597 | 7/1983 | Traugh | 224/42.13 |
| 4,884,728 | 12/1989 | Temple | 224/42.13 |
| 4,911,343 | 3/1990 | Loros et al. | 224/42.43 |
| 4,948,021 | 8/1990 | Murphy et al. | 224/42.13 |

*Primary Examiner*—Henry J. Recla
*Assistant Examiner*—Antoine Gamarra
*Attorney, Agent, or Firm*—Walter C. Farley

[57] ABSTRACT

A bicycle support rack is mountable on a space tire externally supported on a vehicle. The rack includes a frame which has an opening through which only a portion of the tire can pass so that the frame can be placed over the top of the tire and positioned to embrace the tire. A support plate extends horizontally from the frame and includes troughs to receive the horizontal bars of one or more bicycles. A retaining bar extends across the support plate above the horizontal bars of the bicycles and extends into the central portion of the wheel on which the tire is mounted. The retaining bar is held in place by a lock which encircles a horizontal bar of at least one of the bicycles. The retaining bar can be removed from its locking position and threadedly inserted into a hole in the support plate with a swivel attachment to provide a working support for bicycle maintenance.

6 Claims, 7 Drawing Sheets

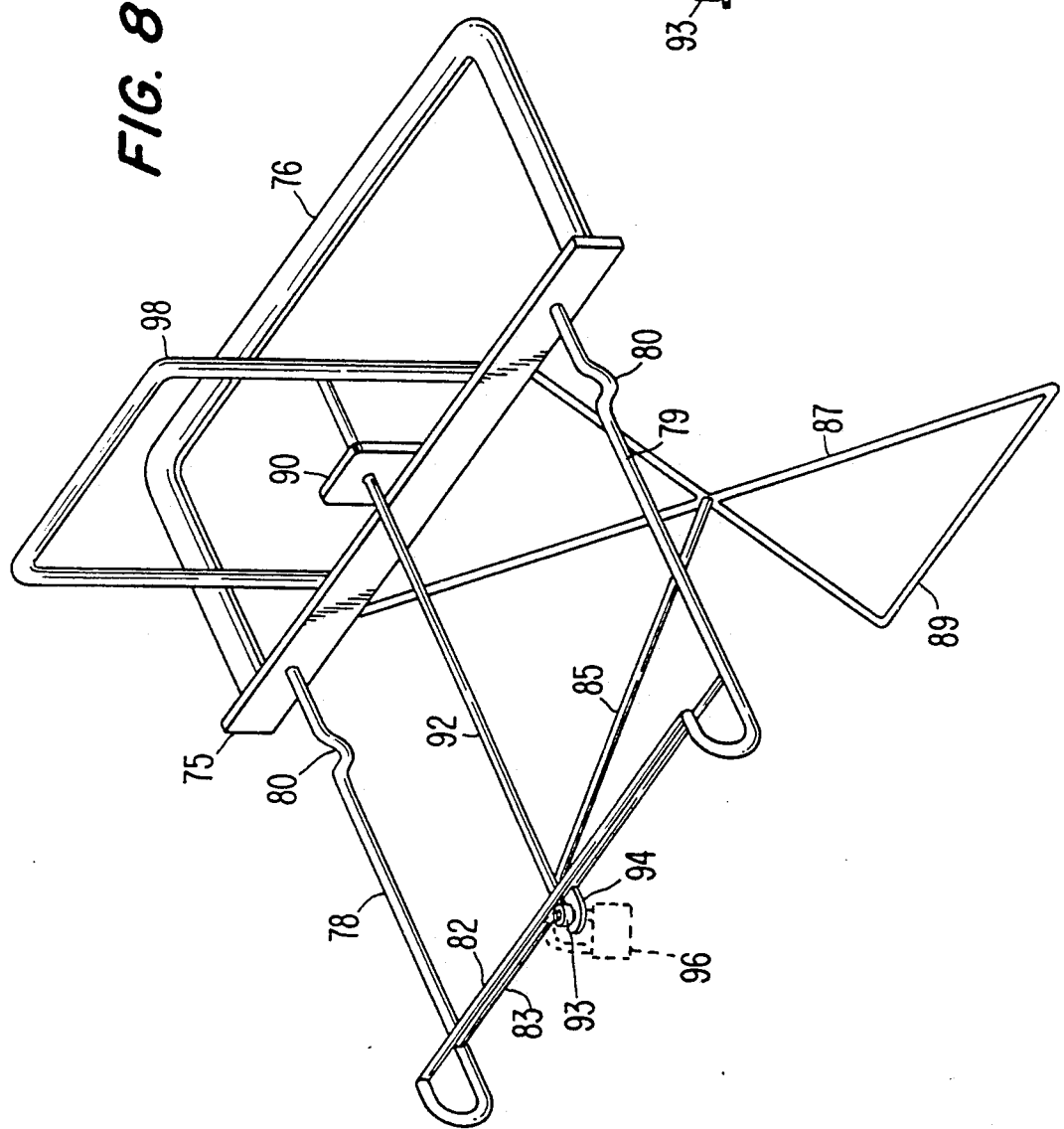
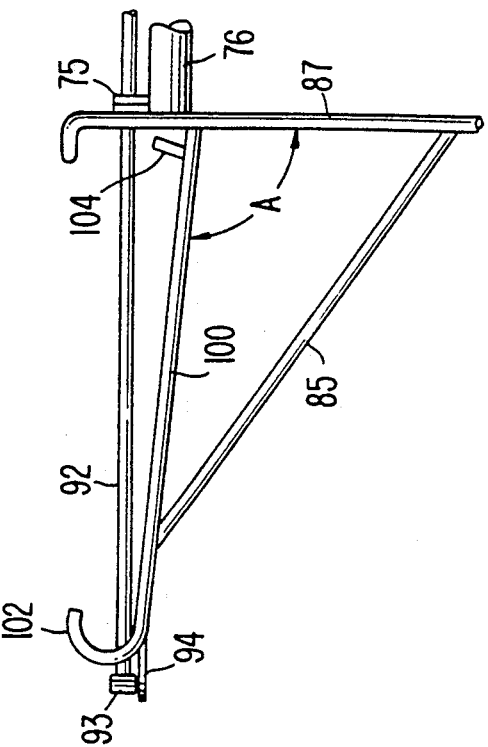

SUPPORT RACK FOR BICYCLES AND THE LIKE

SPECIFICATION

This invention relates to a support rack mountable on a vehicle of the type having a rear-mounted spare tire for carrying bicycles and the like while the vehicle is in motion and for providing a maintenance support when the vehicle is not moving.

BACKGROUND OF THE INVENTION

Many types of bicycle racks have been devised to permit the transportation of one or more bicycles, typically on a car or van. The most familiar ones are supported on the rear deck, trunk, or door or on the roof, or even on a trailer hitch using various forms of straps, hooks and other devices for engaging parts of the vehicle.

However, when the vehicle is a recreational vehicle or "off-road" vehicle of the type having a spare tire externally mounted at the rear, a different problem is presented and the conventional rear-mounted carriers will not work. Additionally, many such vehicles have soft tops, precluding the use of a roof-mounted rack. While efforts have been made to devise a support rack to solve this problem, the results have not been particularly successful since they are not secure.

Additionally, none of the racks designed for supporting bicycles on vehicles are capable of providing a secure and convenient place for bicycle maintenance which may be required while in the kind of non-urban environment in which a cross-country bicycle or mountain bicycle is commonly used. Security is especially important because of the high prices of bicycles today.

SUMMARY OF THE INVENTION

Accordingly, an object of the present invention is to provide a support rack for bicycles or the like which can be easily and securely mounted on a spare tire externally mounted on a vehicle.

A further object is to provide such a rack which can be locked in place in such a way that it is not readily removable by unauthorized persons.

A still further object is to provide such a rack which provides better support than the racks of the prior art and the parts of which can easily be rearranged to form a work support for holding a bicycle in an inverted position to facilitate routine maintenance such as adjustments of the moving parts, changing of tires and the like.

Briefly described, the invention comprises a bicycle support rack mountable on a spare tire externally mounted on a vehicle with the central axis of the tire in a generally horizontal plane, the rack comprising the combination of a frame with a generally rectangular opening having a long dimension smaller than the outer diameter of the tire and a short dimension no smaller than the axial width of the tire so that the frame can be placed over the upper portion of an externally mounted spare tire. A support portion is fixedly attached to the frame and extends therefrom so as to lie in a generally horizontal plane when the frame embraces the tire. The support portion includes recesses for receiving a bicycle frame member. A support strut extends downwardly from the support portion and frame adjacent a plane containing the outer, generally vertical surface of the tire and a diagonal brace extends between the support portion and the strut. An elongated retaining bar is positionable above the bicycle frame in a generally horizontal plane with one end of the bar penetrating the plane containing the outer, generally vertical surface of the tire and extending to a location adjacent the wheel on which tire is mounted. A conventional locking device such as a U-bar lock of the type sold under the trademark KRYPTONITE holds the bar in that position so that the rack cannot be removed from the tire and the bicycle cannot be removed from the rack without first disengaging the locking device.

In a further aspect of the invention, the retaining bar has an externally threaded end and the rack further includes an internally threaded opening in the support portion having a generally vertical axis for receiving the threaded end of the retaining bar and holding the retaining bar with its longitudinal axis generally vertical and with the end opposite the threaded end uppermost. A receiving member is attachable to the uppermost end of the bar for receiving and holding a portion of the bicycle frame while the bicycle is inverted and is resting on the support portion in a position convenient for bicycle maintenance.

BRIEF DESCRIPTION OF THE DRAWINGS

In order to impart full understanding of the manner in which these and other objects are attained in accordance with the invention, particularly advantageous embodiments thereof will be described with reference to the accompanying drawings, which form a part of this specification, and wherein.

DETAILED DESCRIPTION OF THE PREFERRED EMBODIMENTS

Figure 1:
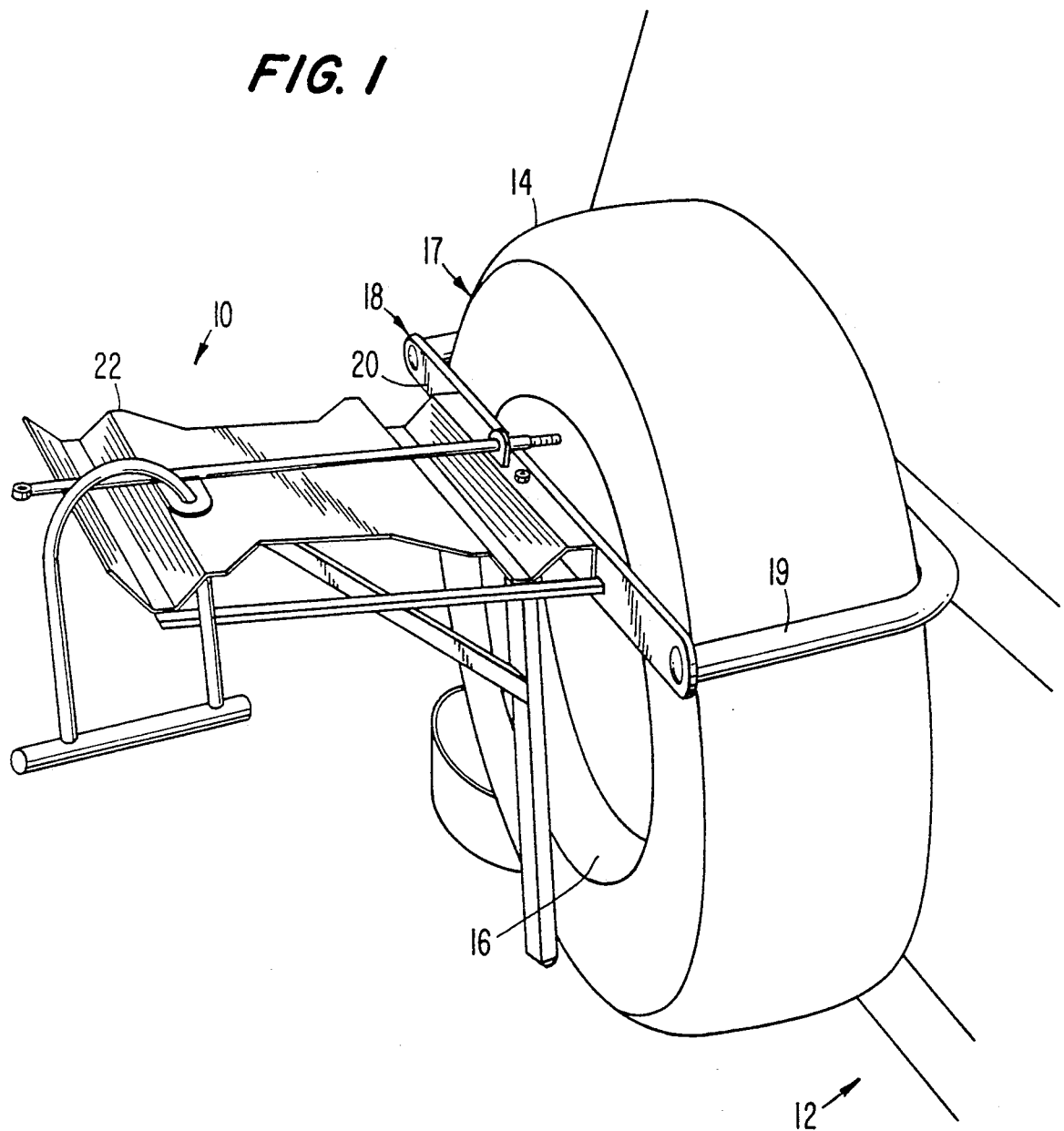
FIG. 1 is a perspective view of a support rack in accordance with the invention mounted on a spare tire at the rear of a vehicle.

Referring first to FIG. 1, a bicycle support rack indicated generally at 10 is shown in FIG. 1 as being attached to a vehicle 12 which has a spare tire 14 mounted on the back of the vehicle in a conventional fashion. The tire is mounted on a wheel 16 which has the usual rim configuration. An outer exposed surface of the tire 17 faces rearwardly with respect to the vehicle and, and for convenience, the directions with respect to the normal direction of motion of the vehicle will be used in the following discussion.

The support rack includes a frame 18 which, in the embodiment shown, includes a generally U-shaped rigid rod or tube 19 the open end of which is secured to a substantially rigid bar 20. This frame defines an opening which can be placed over the upper portion of tire 14, the opening being generally rectangular and having a long dimension which is smaller than the outer diameter of the tire so that the shorter ends of the rectangular opening rest on the tire tread several inches above the axis of the tire and wheel. The short dimension of the rectangular opening should be slightly larger than the axial dimension of the tire, i.e., the distance between the outer surfaces of the tire sidewalls.

Figure 2:
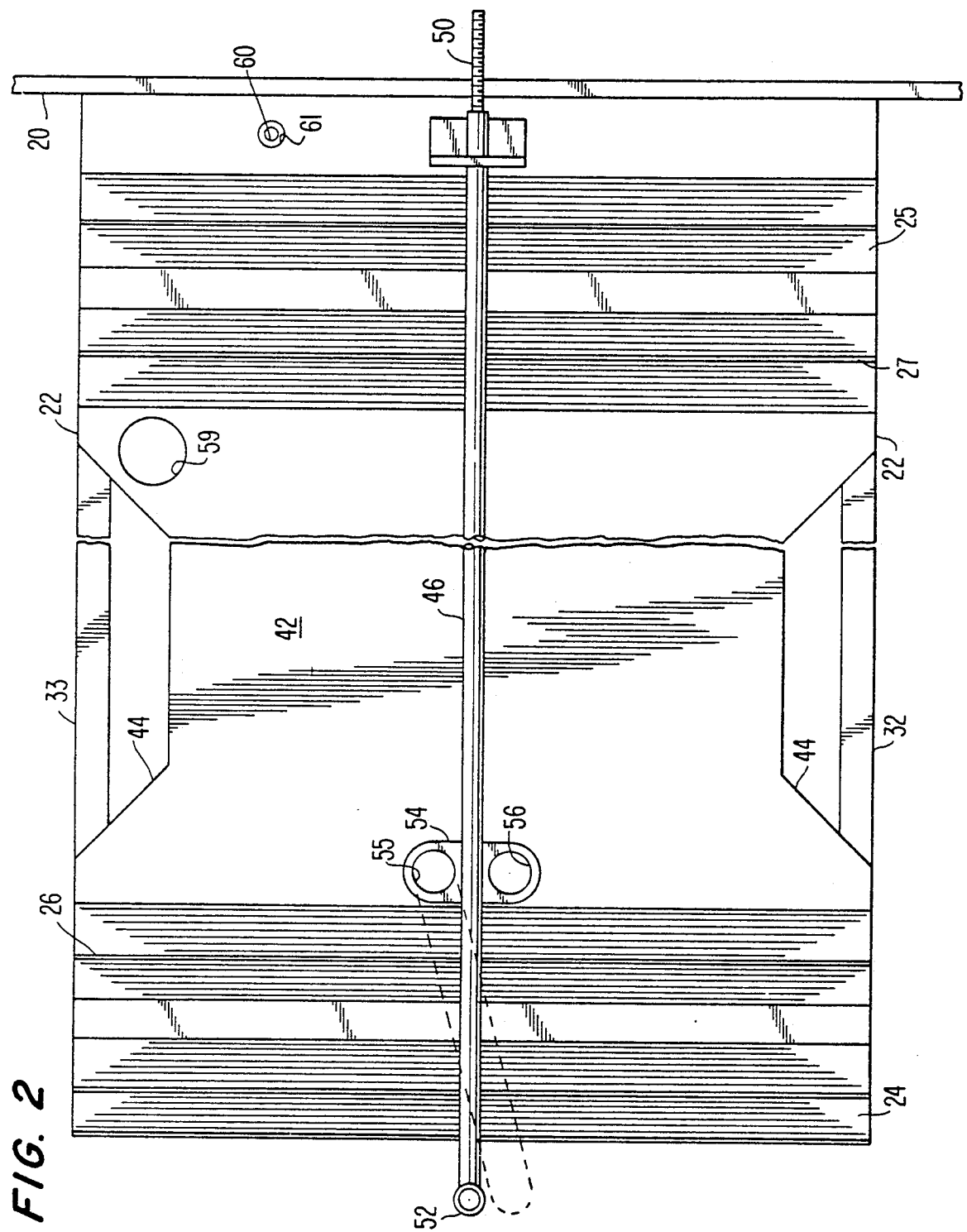
FIG. 2 is a top plan view of the support rack of FIG. 1.
Figure 3:
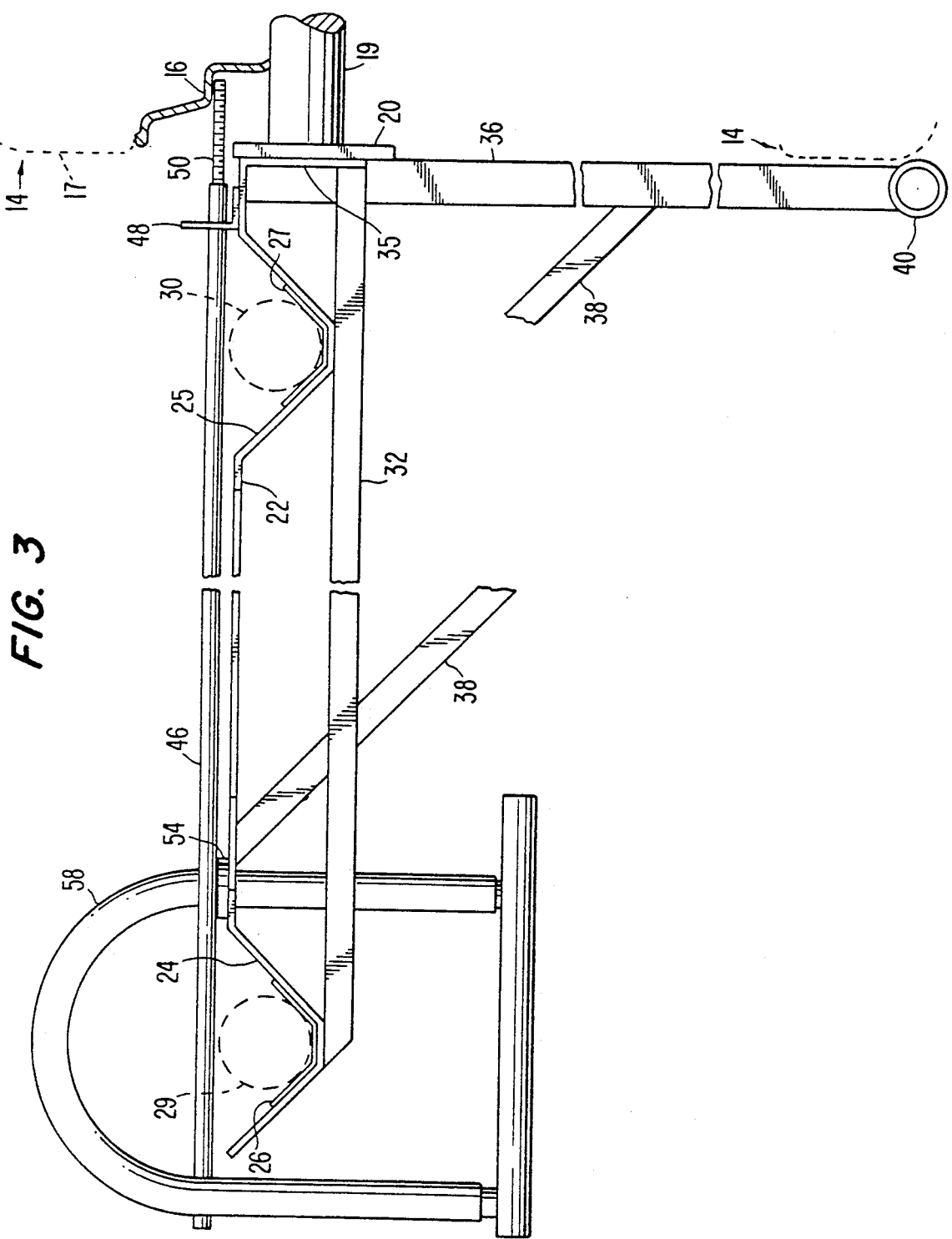
FIG. 3 is a sectional side elevation of the support rack of FIG. 2.

Attached to bar 20 is a metal support plate 22, the details of which are best seen in FIGS. 2 and 3. Plate 22 is made of sheet metal and can be on the order of 12 inches wide and 14 inches deep. It is formed with laterally extending troughs 24 and 25 which are on the order of 1.5 inches deep and which are preferably provided with liners 26 and 27 of rubber or other soft material to receive the top bars 29 and 30 of bicycles to be supported on the rack. The lateral width of each trough provides support throughout a major portion of the horizontal bar of each bicycle, somewhat better support than the usual carrier which normally has two spaced bars to hold the bicycle. Distribution of stress and greater stability is thus provided.

Beneath plate 22 are horizontally extending support members 32 and 33 which are welded to the bottom surfaces of the troughs. A flange 35 extends downwardly from the forward end of plate 22 and is fixedly attached, as by welding, to bar 20 of the frame portion and also to the forward ends of support members 32 and 33.

A support strut 36 is fixedly attached to either or both of flange 35 and bar 20, as by welding, and extends downwardly far enough to contact the rearward facing sidewall of tire 14. Strut 36 can be positioned at an angle of between about 90° and about 105°, depending upon the type of tire mount with which it is to be used, so that the major upper surface of plate 22 is generally horizontal when the structure is mounted on a tire. A diagonal brace 38 extends between the lower surface of plate 22 and brace 36 and is fixedly attached at both ends to provide further support. At the lower end of strut 36 a tubular opening 40 can be provided so that straps or other securing lines can be attached at that location and around appropriate portions of the bicycles being supported. Opening 40 can be formed by welding a short section of pipe to the lower end of strut 36.

As best seen in FIG. 2, plate 22 has a central portion 42 which is flat and which acts primarily as a spacer between the bicycle-supporting troughs. The sides of portion 42 are provided with recesses 44 to allow securing lines or straps to pass therethrough.

An elongated retaining bar 46 is attachable to the structure thus far described for the purpose of keeping the bicycles in the appropriate position, bar 46 also being usable to provide a support for maintenance of a bicycle, as will be subsequently described. Bar 46 passes through an opening in a bracket 48 which is fixedly attached to a forward portion of support plate 22 substantially in the center thereof. The forward end 50 of bar 46 is externally threaded and the rearward end 52, as best seen in FIG. 2, is provided with a tubular opening similar to, but smaller than, opening 40 in strut 36. A locking plate 54 is fixedly attached to bar 46 so that, when the retaining bar is in the proper position to hold the bicycles in troughs 24 and 25, an opening 55 through the locking plate is aligned with a similar opening in portion 42 of plate 22 so that the shaft of a conventional U-bar lock 58 can be passed through the aligned openings in the manner generally illustrated in FIGS. 1—3 to hold bar 46 in the bicycle-retaining position. It will be observed that the U-bar lock encircles the horizontal bar 29 of the bicycle in the rearmost trough 24 so that even if the lock and the retaining bar are lifted enough to permit the bicycle horizontal bar to be lifted out of the trough, the bicycle cannot be removed from the vicinity of the carrier. An additional hole 56 can be provided in locking plate 54, and other openings such as an opening 59 can be provided in plate 22 to permit a variety of locking arrangements. However, it is particularly important to note that the rack is locked to the spare tire and the bicycle (or bicycles) is locked to the rack using a single U-shaped lock 58.

As seen in FIGS. 1 and 3, the length of bar 46 between locking plate 54 and the distal end of threaded portion 50 is sufficiently great so that the threaded end extends into the region of the wheel rim 16, passing radially inwardly of a flat portion of the rim so as to preclude the possibility of frame 18 and the bicycle rack being lifted vertically off of the tire. Although unauthorized efforts to remove the carrier from the tire might result in tilting of the entire rack, it cannot be removed without destroying portions of the rack or the tire, efforts which require considerable force and tools. The rack is therefore securely attached to the carrier and is capable of withstanding removal efforts. All attached components are preferably welded together to form a solid secure structure which will withstand such removal efforts. The opening in bracket 48 can be internally threaded to threadedly receive the end of bar 46, adding to the security of the assembly.

Figure 4:
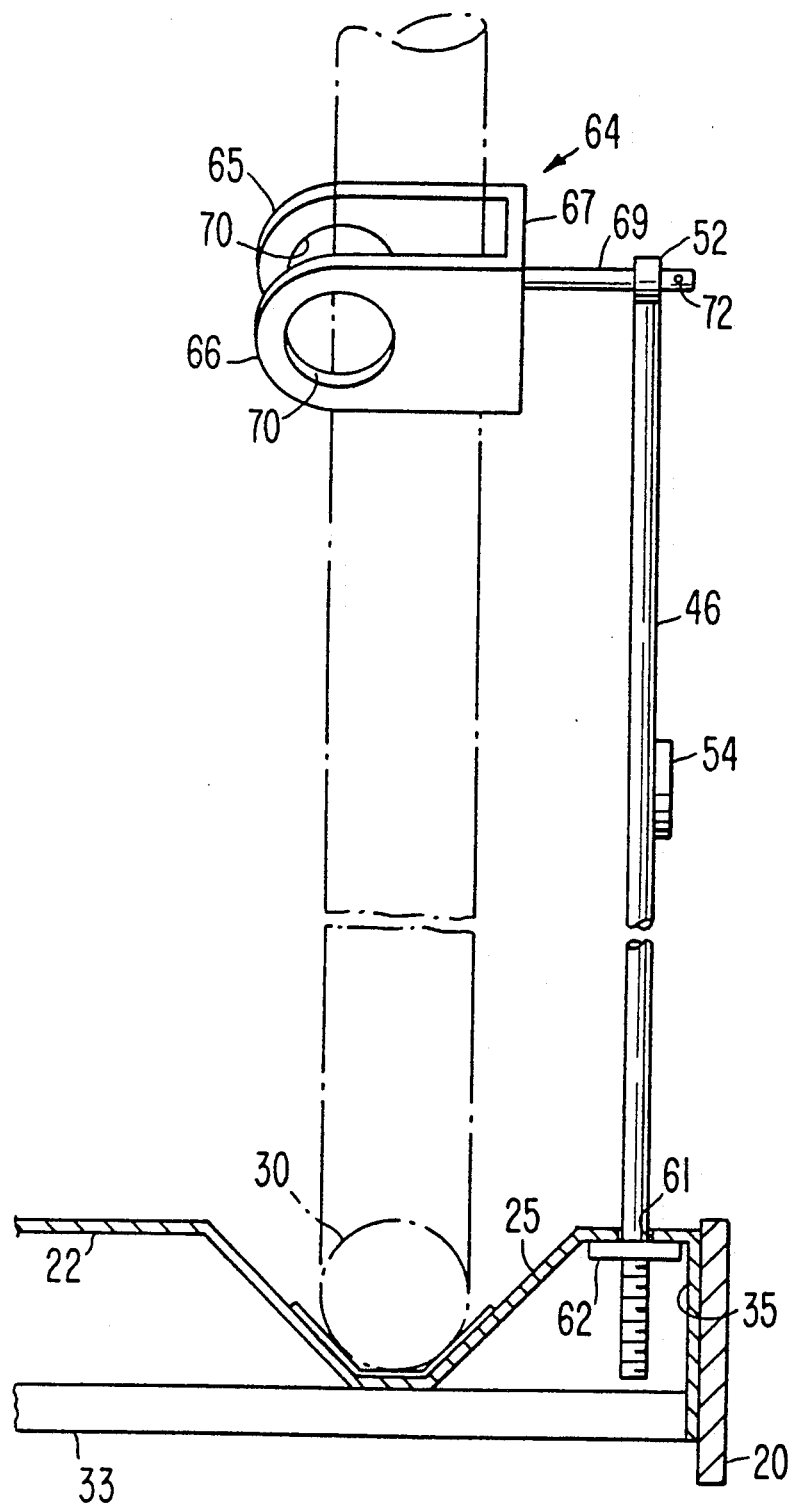
FIG. 4 is a partial side elevation of the support rack of FIGS. 1-3 with the retaining bar mounted in the position to support a bicycle for maintenance.
Figure 5:
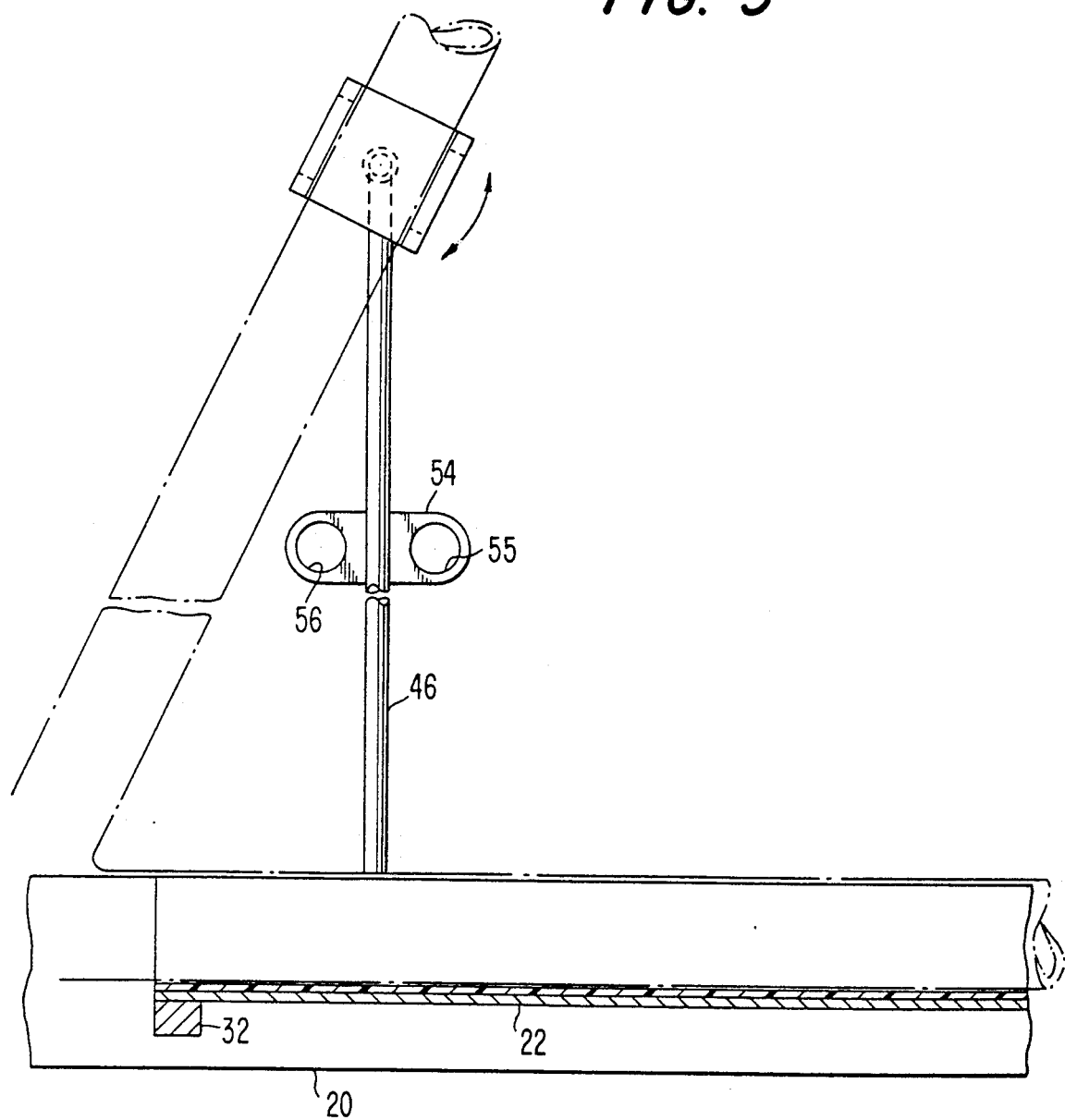
FIG. 5 is a partial rear elevation of the arrangement of FIG. 4.

Referring now to FIGS. 2, 4 and 5, it will be seen that the structure thus far described, with one additional fitting, can be employed to position a bicycle in a sturdy, inverted position to permit one to perform routine maintenance such as the adjustment of the gear shift mechanisms, lubrication, changing of tires, adjustment of brakes and the like. This arrangement includes the removal of retaining bar 46 from the position shown in FIGS. 1-3 and the insertion of threaded end 50 of that bar into an internally threaded hole 60 in a nut or mounting plate 62 supported beneath plate 22 in a flat portion just to the rear of flange 35. Internally threaded nut or plate 62 is fixedly attached to plate 22 beneath an opening 61 through the plate itself.

A separate swivel fitting 64 is generally U-shaped with arms 65 and 66 and an interconnecting back plate 67. A rod 69 attached to the back plate is slidably insertable into tubular opening 52 at the end of bar 46, permitting fitting 64 to be rotated about the axis of rod 69. Generally aligned openings 70 penetrate arms 65 and 66. The distal end of rod 69 can be provided with an opening 72 to receive a cotter pin or the like to keep the swivel fitting in position.

In order to position a bicycle for maintenance, bar 46 is threaded into the opening in plate 62 and a bicycle is positioned, wheels up, with its horizontal bar 30 in trough 25. Swivel fitting 64 is attached to the upper end of the retaining bar and rotated so that the arms are parallel with the sides of one of the down bars of the bicycle, depending upon the lateral position in which the bicycle is placed. A cotter pin can be inserted through opening 72 and an elastic cord, strap or the like can be passed through openings 70 to keep the bicycle in this position to allows hands-free work.

When the work is completed, the components can be returned to their original positions. The only extra article which requires storage in some form is swivel fitting 64 and its associated cotter pin.

In the foregoing illustrations, the support plate 22 has been depicted as being attached approximately in the center of bar 20. This is a suitable arrangement when the tire is mounted approximately along the center line of the vehicle to which it is attached. However, on many vehicles, the tire is mounted either to the right or to the left of the center line for various reasons such as the attachment of the tire to a vehicle rear door. In such cases, with the carrier mounted in the center of bar 20, there is a possibility that one wheel of the bicycle will protrude beyond the side of the vehicle, presenting the possibility of damage to the bicycle should the bicycle approach a stationary object too closely.

Figure 6:
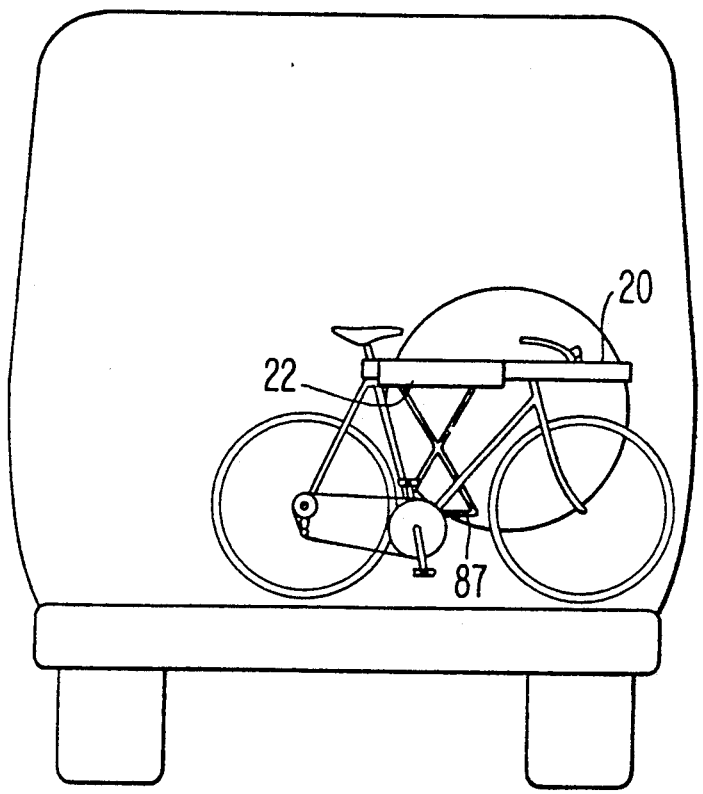
FIGS. 6 and 7 are schematic rear elevation and top plan views, respectively of a further embodiment for use with vehicles having spare tire mounts offset to one side of a vehicle.
Figure 7:
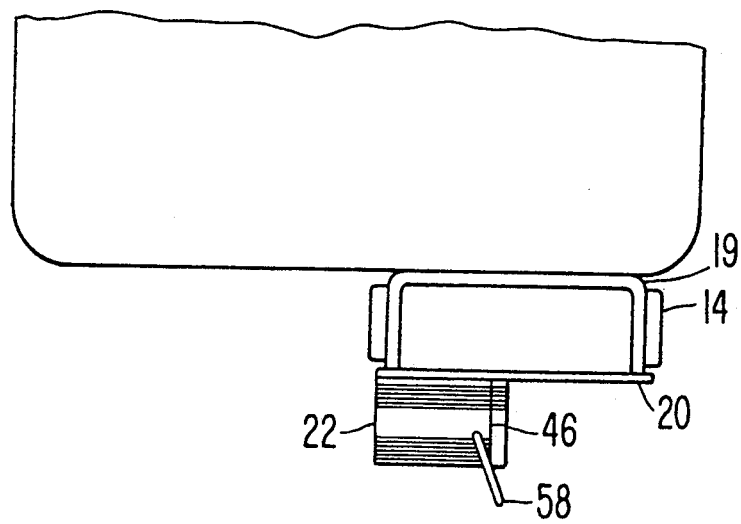

For this purpose, a further embodiment of the invention is shown in FIGS. 6 and 7 wherein the structure is identical except that plate 22 is attached at the left end of bar 20 as seen from behind the vehicle when the spare tire is mounted on the right side of the vehicle. As seen in FIG. 7, this arrangement necessitates the location of retaining bar 46 to the side of plate 22 closest to the axis of the tire so that end 50 can engage the wheel rim on which the tire is mounted. Lock 58 is then attached through the plate in a manner similar to that described in connection with FIGS. 1—3. It will be apparent that the reverse arrangement is employed with the tire mounted to the left side of the vehicle.

FIG. 8 illustrates a further embodiment of a support rack in accordance with the invention which includes a different structural form and also includes certain features which are usable in the embodiment of FIGS. 1—3 as well. As seen in FIG. 8, the rack includes a transverse rigid bar 75 and a U-shaped rod or tube 76 for embracing the tire. The bicycle support portion includes rearwardly extending rods which can be provided with downwardly extending recessed portions 80 to receive the horizontal tubes of bicycles. Transverse support rods 82 and 83 are welded to rods 78 and 79 and the rods themselves are welded to bar 75.

A diagonal brace 85 extends downwardly and rearwardly from the middle of rod 83.

An X-shaped brace 87 is provided in place of brace 36, brace 87 having its upper ends welded to bar 75 and having a lower horizontal rod portion 89. As with brace 36, brace 87 is positioned to rest against the rearwardly facing surface of the spare tire to maintain the bicycle support portion in a generally horizontal position. Preferably, the plane containing rods 78 and 79 forms an angle of approximately 105° with the plane containing brace 87. The forward end of diagonal brace 85 is welded to the inner section of the X forming brace 87.

At approximately the mid point of bar 75 is an upwardly extending plate 90 having a central opening to receive longitudinally extending rod 92 which is almost identical to rod 46 of the embodiment previously described except that it need not have a threaded end portion 50. At the rear end of rod 92 is a circular opening similar to rod 46. A substantially horizontal plate 94 is welded to the central region of rod 82, plate 94 having a central opening to receive the hasp of a conventional padlock which passes through the tubular opening 93 at the end of rod 92 and the opening 95 in plate 94. It will be observed that lock 96 is a conventional padlock, as distinguished from a bicycle lock. The provision of plate 94, which can be used in connection with support plate 22 of the embodiment of FIGS. 1-3 allows the use of the single padlock 96 to retain the bicycles on the support rack and simultaneously keep the entire support rack structure on the spare tire, by virtue of the locking function of the forward end of rod 92.

Because of the rods used to form the structure of FIG. 8, a separate, U-shaped brace 98 is welded to bar 75 so that it extends upwardly, forming a support for holding a bicycle in the inverted position for maintenance purposes. The bicycle can simple be place against brace 98 and, if necessary, held in that in position with an elastic cord or a strap. This brace can also advantageously be employed in the embodiment of FIGS. 1-3.

The structure of FIG. 8, which is made from welded steel rods or the like and subsequently coated with a vinyl plastic or similar material in order to prevent abrading the bicycles, has the advantage of lightness and also the advantage of providing a large number of locations about which straps, etc. can be placed to hold the bicycles in position and to further secure the entire rack so that it does not wobble or sway while the vehicle is in motion. The amount of support provided for the bicycle is, however, less than with the support plate 22.

FIG. 9 illustrates a minor modification of the embodiment of FIG. 8 in which the generally horizontal support rods 100 are formed without indentations or recesses 80 to receive the horizontal tube of a bicycle. Instead, the distal rear ends of rods 100 are formed with upwardly bent portions 102 and an additional transversely extending stop member 104 is welded across rods 100 near bar 75 to limit motion of the bicycles in the forward direction. In this embodiment, the bicycles are retained in position by straps or cords. FIG. 9 also illustrates the angle A between the support rods and the vertical brace 87 which, as mentioned above, should be in the order of about 105°.

While certain advantageous embodiments have been chosen to illustrate the invention, it will be understood by those skilled in the art that various changes and modifications can be made therein without departing from the scope of the invention as defined in the appended claims.

What is claimed is:

1. A bicycle support rack mountable on a spare tire externally mounted on a vehicle with the central axis of the tire in a generally horizontal plane, the rack comprising the combination of a frame including means defining a generally rectangular opening having a long dimension smaller than the outer diameter of the tire and a short dimension no smaller than the axial width of the tire so that said frame can be placed over the upper portion of an externally mounted, spare tire a support portion fixedly attached to said frame and extending therefrom so as to lie in a generally horizontal plane when said frame embraces said tire, said support portion including recess means for receiving a bicycle frame;

a support strut connected to and extending downwardly from said support portion and frame adjacent a plane containing the outer generally vertical surface of said tire;

a diagonal brace connected to and extending between said support portion and said strut;

an elongated retaining bar positionable above said bicycle frame in a generally horizontal plane with an inner end of said bar penetrating said plane containing said outer, generally vertical surface of said tire and extending to a location adjacent the wheel on which said tire is mounted; and means for locking said bar in said position, whereby said rack cannot be removed from said tire and said bicycle cannot be removed from said rack without first disengaging said means for locking.

2. A rack according to claim 1 and further comprising an opening adjacent the attachment location of said support portion to said frame for receiving and inhibiting lateral motion of said retaining bar.

3. A rack according to claim 2 wherein
said retaining bar has an externally threaded end, and said rack further comprises
an internally threaded opening in said support portion having a generally vertical axis for receiving said threaded end of said retaining bar and holding said retaining bar with its longitudinal axis generally vertical and with the end opposite said threaded end uppermost, and
means attachable to said uppermost end of said bar for receiving and holding a portion of said bicycle frame while said bicycle is inverted and is resting on said support portion in a position convenient for bicycle maintenance.

4. A rack according to claim 3 wherein said means attachable to said uppermost end of said bar is pivotable about a generally horizontal axis.

5. A rack according to claim 1 wherein said means for locking consists of a single lock holding said rack on said spare tire and said bicycle on said rack.

6. A rack according to claim 1, wherein said support portion is selectively attached off-center with respect to said frame so as not to allow said bicycle to protrude from edge of vehicle.

* * * * *